Dec. 1, 1959  A. R. MORE  2,914,937
HARDNESS TESTER
Filed June 2, 1954  2 Sheets-Sheet 1
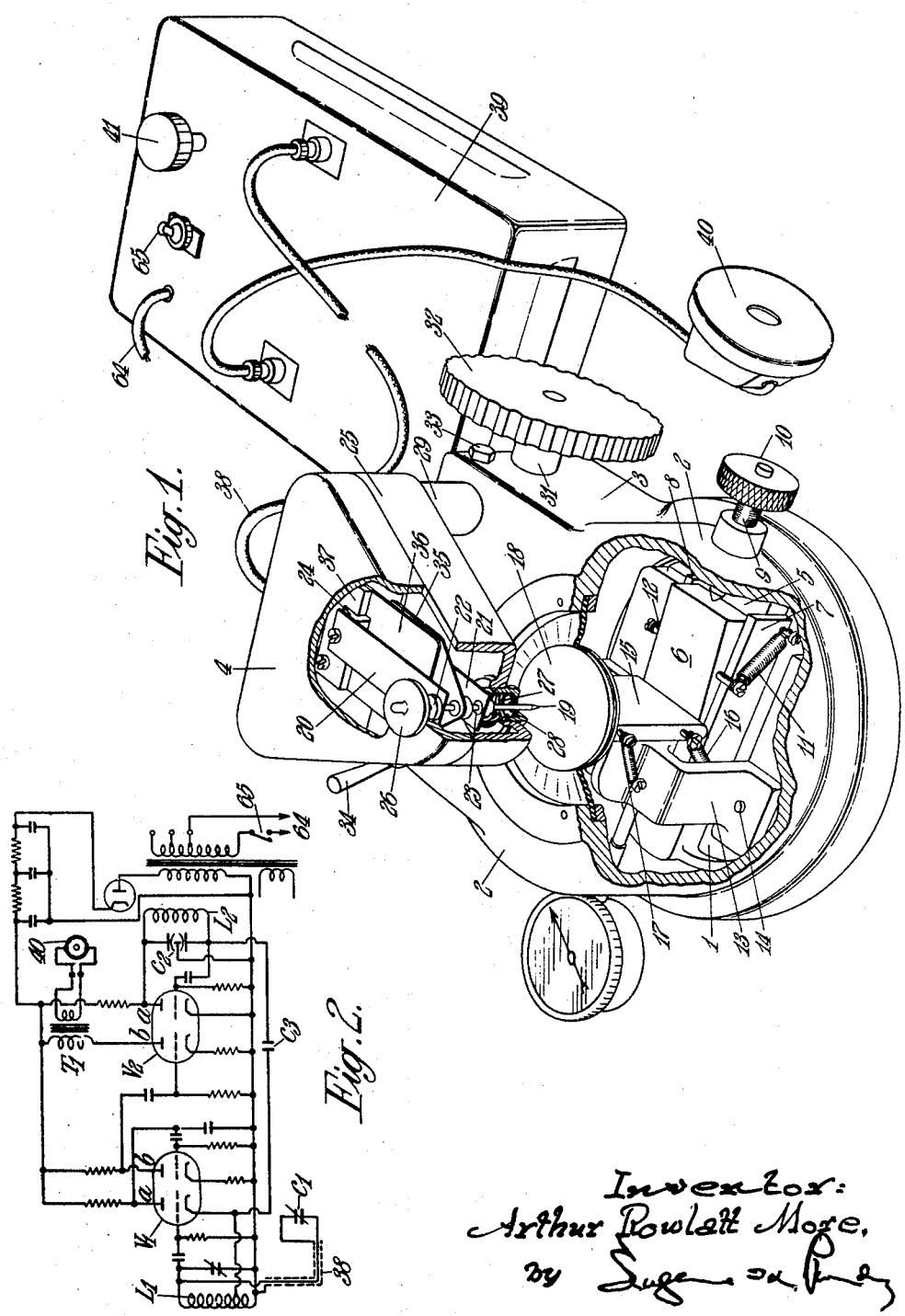
Inventor:
Arthur Rowlatt More,
by [signature]
Attorney

United States Patent Office 2,914,937
Patented Dec. 1, 1959

2,914,937

HARDNESS TESTER

Arthur Rowlatt More, Croydon, England, assignor to H. W. Wallace & Company Limited, Croydon, England Application June 2, 1954, Serial No. 434,021

15 Claims. (Cl. 73—81)

This invention relates to hardness testers, in particular but not exclusively to so called micro-hardness testers in which the material to be tested is caused to be penetrated or indented to an extremely small extent, for example of the range 1–20 microns.

Hardness testers are well known for use in testing, for example thick rubber, having a standard dial micrometer with an indentor fitted to the lower end of its plunger and a scale pan to the upper end thereof. When weights are added to the scale pan the travel of the plunger is shown on the dial thus indicating the extent of indentation, but, as it takes some 20 grams or more to move the plunger of the dial gauge due entirely to the internal friction of the device, such an arrangement is quite unsuitable for micro-hardness testing.

The object of the invention is to provide a hardness tester of the kind in which a predetermined or standard load is applied by way of a small indentor to the surface of the material to be tested and in which the depth of penetration or indentation of the surface by the indentor under such load may be accurately gauged when the extent of penetration or indentation is extremely small.

The invention consists in a hardness tester comprising an indentor, means to support the indentor and allow movement of the same to approach and indent or penetrate the material to be tested without friction between relatively movable surfaces, means to indicate when the indentor is in a predetermined position in relation to the support, means to move the support and the material relative to one another in the line of movement of the indentor, means to measure the extent of said relative movement and means by which a load may be applied to the indentor.

The invention further consists in a hardness tester as set forth in the preceding paragraph in which the indentor is mounted on a plunger for vertical movement downwards to indent or penetrate the material, the means to indicate the position of the indentor is a variable capacitor associated with the plunger and the support means and an electrical indicating circuit, the means to measure the extent of relative movement is a micrometer gauge, and the means by which the load may be applied to the indentor is a pan for the reception of a weight or weights.

The accompanying drawings show, by way of example only, two embodiments of the invention in which:

Figure 1 is a perspective cut-away view of one form of embodiment,

Figure 2 is a circuit diagram of the indicating portion of the embodiment of Figure 1, while

Figure 3:
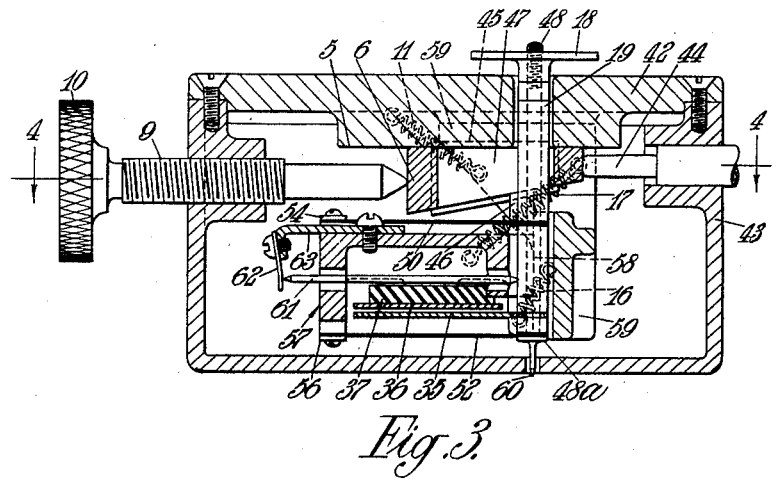
Figures 3 and 4 are cross section and plan view on the line 4—4 of Figure 3 respectively of a further form of embodiment.

In the form of construction shown in Figure 1, the instrument is provided with a circular metal base 1 which is covered by a cylindrical cover 2 provided at one side with a rectangular projection 3 which provides support for the head 4 of the instrument. The circular base 1 is housed within a rebate around the bottom of the cylindrical cover 2 and is securely fastened thereto by screws.

The upper surface of the base 1 is provided with a horizontal plane surface 5 upon which rests a wedge 6 adapted to slide along the said surface, being kept within close transverse limits by the guide plates 7, 8. The wedge, for example, may have a sloping upper surface of 1 in 10 so that a reduction in movement may be obtained between the horizontal movement of the wedge and the vertical movement imparted to a member movable along a vertical axis passing through the wedge. In order to accurately move the wedge horizontally a screw threaded bolt 9 with a milled knob 10 is provided in the side of the cover 2, while the wedge is maintained in intimate contact with the plane surface 5 by a pair of springs 11, 12 which, at the same time, urge the wedge in the direction of the bolt to effectively prevent any backlash.

A bridge member 13 is bolted by the pair of bolts 14 to the base and is provided with a vertical plane surface against which the upright 15 of the T-shaped member is held by two pairs of springs, two of which 16, 17 only are shown, at the same time urging the base of the T to contact the upper surface of the wedge 6. The upper part 18 of the T-shaped member is formed as a circular table on which the material being tested rests. The bottom of the upright is shown rounded so that it makes only a line contact with the wedge, but which may be flat and at the same angle as the wedge if desired.

A dial type micrometer gauge is mounted axially of the bolt 9 and on the opposite side of the cover and with its plunger in contact with the wedge, so as to indicate the extent of horizontal movement of the wedge. When the wedge has a taper of 1 in 10 a standard 1/1,000 inch dial gauge will indicate the vertical movement of the T-shaped member resting on the wedge in units of 1/10,000 inch, or alternatively, if a 1/10,000 inch dial is used it will indicate vertical movement in units of 1/100,000 inch. Owing to the method of mounting both the wedge and the T-shaped member, the extent of movement of the table 18 can be measured very accurately and without any form of backlash.

The head 4 of the instrument carries the indentor, the plunger 19 of which is fastened to a pair of leaf springs 20, 21 by means of the bushes 22, 23. By this means the indentor may move vertically without friction between relatively moving surfaces. The leaf springs are secured to the ends of the vertical support 24 fastened to the lower half 25 of the head 4.

The top of the indentor plunger 19 is provided with a small circular pan 26 for receiving the weights used in the tests, which cause the indentor to indent the sample placed upon the table 18. A light helical spring 27 is supported in a screw threaded hollow cylindrical bush which is adjustable as to height in the bottom of the head, the upper end of the spring supporting the indentor. This spring is adjusted so as to support the weight of the weight pan and indentor and to hold the leaf springs horizontal when there is no weight in the pan.

In order to accommodate the instrument to different thicknesses of sample being tested the head 4 is mounted on a pair of pillars 29, 30 which are each provided with a toothed rack which engage a pinion on the shaft 31 and by which the head is raised or lowered by the knurled knob 32. The projection 3 is provided with a slot opposite each pillar so that by the aid of the bolt 33 and a threaded lever 34 the pillars may be locked in position.

During the course of carrying out a test the position of the indentor is roughly adjusted close above the sample by means of the knob 32 and locked into position by the lever 34. The sample is then lifted by moving the table 18 by means of the knob 10 until contact is only just made with the indentor. As it is not possible to feel when this has taken place via the wedge, an indicating means is provided to show when this condition is arrived at. A number of different systems may be employed but the one preferred is that shown upon the embodiments illustrated and in which use is made of the change of capacity of a capacitor comprising two plates, one plate being connected to the indentor plunger while the other is connected to the head of the instrument, the plates being suitably insulated from one another. These plates are in planes at right angles to the line of movement of the indentor so that change of capacity results from movement of the indentor. A differential capacitor may be provided if desired by incorporating two plates on one member and one on the other while the capacitors are connected to the two sides of a bridge circuit by the adjustment of which a nil or balanced reading is obtained, while any change of position of the central plate upsets the balance of the bridge, while a return of the indentor to the zero position re-establishes a balance in the circuit and the fact is indicated. However, in the embodiments illustrated a single variable capacitor is incorporated having a movable plate 35 fixed to the indentor plunger and a fixed plate 36 attached by means of the insulator 37 to the lower part 25 of the head. The movement upward of the indentor increases the capacity and movement downwards decreases the capacity of the capacitor. The plates of the capacitor are connected by the concentric screened cable 38 to the indicating device 39, the centre conductor being connected to the fixed plate 36 while the outer screen is connected to the frame of the head and thus the movable plate 35. By using an earphone 40 and adjusting the knob 41, the pitch of a note produced may be lowered until a zero or no beat position is found, from which position the pitch of the note will rise rapidly on change of the capacity of the capacitor in either direction, and therefore it is a simple matter to return the indentor to a predetermined position by the adjustment of the milled knob 10, if the indentor is in contact with the sample, or alternatively a clear indication is given immediately the sample is raised to contact the indentor. Details of the indicating device will be given later.

One method of carrying out a test is as follows. The plunger is first raised above the table sufficiently for the sample to be tested to be placed thereon, and the plunger is then lowered into a position such that the indentor just clears the surface of the sample by means of the knob 32 and is then locked by the lever 34. The indicator is then adjusted by the knob 41 until the lowest pitch or zero beat note is produced, which thus indicates the zero position of the indentor. The table carrying the sample is then raised slowly by means of the knob 10 until the indentor just touches the surface of the sample indicated by the change from the zero adjustment of the indicator. The table is then slightly lowered until a point is established when the indentor just touches the sample and the indicator gives a zero reading. The dial gauge is then set to zero and the required load is placed upon the pan of the plunger. This load causes the indentor to indent or penetrate the surface of the sample, at the same time upsetting the zero indication of the indicator, and therefore in order to remove any resistance to movement caused by the deflection of the springs and in order to read the degree of penetration made, the table is raised until a zero point is again indicated on the indicator. Such screwing up of the table is continued during the period over which the test is being carried out, for example 30 seconds, while the final position of the gauge indicates the extent of indentation or penetration.

If now the weight is removed from the pan, and the material of the sample is of the kind which will recover part at least of the deformation, the plunger will rise, and by screwing down the table to such an extent as to keep the indicator at its zero indication, the amount by which recovery of the sample takes place can be obtained from the reading upon the gauge. As readings are taken only when the zero position is indicated upon the indicator no errors are introduced by deflection of the leaf springs supporting the plunger.

The part of the indentor which makes contact with the sample is usually in the form of a steel ball of small diameter and is mounted on the lower end of the plunger which is in the form of a rod. However, the instrument may be provided with a plunger of any other desirable shape without affecting the manner of operation of the same.

Figure 4:
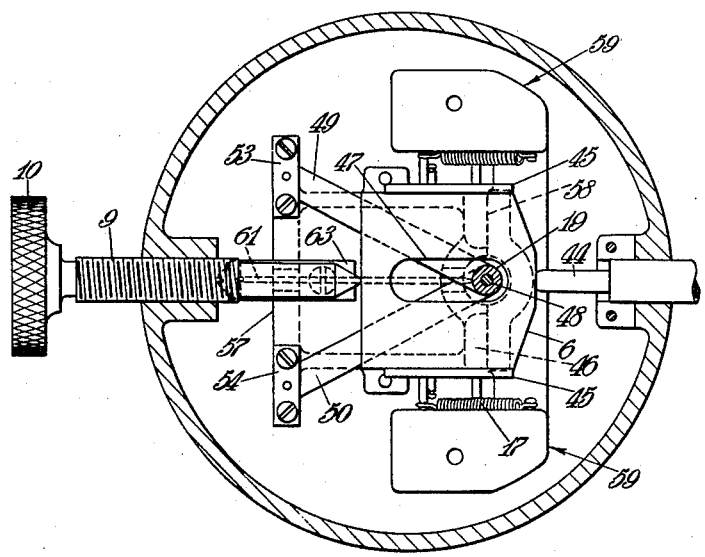

When it is not convenient to place a sample of the material upon the table on the apparatus, the latter may be constructed so as to be stood upon the material being tested, as shown in Figures 3 and 4. In this form of construction the plane surface 5 upon which the wedge 6 slides is formed upon the under surfaces of the circular cover plate 42 which closes the top of the cylindrical casing 43. The wedge 6 is held against the plane surface 5 and the threaded bolt 9 by the spring 11, while the distance moved by the wedge is shown on a dial gauge, the plunger 44 of which makes contact with the end thereof. The wedge is provided with side plates 45 which project upwards and downwards, firstly to align the wedge with the plane surface and secondly to maintain the member 46 within the limits of the wedge.

The wedge has a slot 47 through which the plunger of the indentor works with clearance. This plunger comprises a central rod 48 and tubular bushes which are clamped axially between a circular nut-like shoulder 48a at one end and the weight pan 18 at the other. The indentor is positioned in respect of horizontal planes by two pairs of flexible leaves 49, 50 and 51, 52 which are sandwiched between the tubular bushes at the inner end and between clamping strips 53, 54 and 55, 56 at the outer end and the body of the box-like movable member 57, the function of which will be apparent from the following description.

The plane surface 58 is common to the movable member 57 and a bridge member 59 which is bolted to the under surface of the cover plate 42. Both these members have a circular vertical groove which allows of clearance from the indentor plunger 19. The box-like member 57 has a pair of upwardly extending members 46, above referred to, which engage the surface of the wedge and by means of which the box-like member is caused to slide up and down by horizontal movement of the wedge. By this means the indentor point 60 is adjusted to contact the surface of the material on which the instrument stands through the hole in the bottom thereof.

The method of suspension used for the indentor plunger differs in certain respects from that used in the first embodiment described. The first construction is limited to those applications where the load imposed by the weight is small or of limited range, but seeing that the materials which require to be tested may vary in their hardness from soft metals to soft plastics, the suspension is modified such that a wider range of materials may be tested with the same apparatus and in which the load may vary between a fraction of a gram and several pounds. It is to be understood that the modified suspension hereinafter described is also applicable for use in an instrument of the kind described in reference to Figure 1.

Owing to the method adapted for carrying out a test a very restricted range of movement is required by the indentor plunger, and in fact measurements are only taken when the indentor is at the zero position. It is therefor proposed to support the plunger on a system of tension and compression members, the flexible leaves above referred to, acting mainly as members in tension and therefore they may be extremely thin and give little resistance to the movement of the plunger. They therefore cannot be relied upon to support the weight of the plunger and pan but give adequate lateral stability seeing that they are in continuous tension imparted by the compression member 61 which is urged in the direction of the plunger by the spring 62. In order for this arrangement to resist the weight of the plunger and pan the member 61 is inclined slightly upwards towards the plunger so as to give a balanced structure over the range of loads to be used. In the form of construction shown in Figures 3 and 4 the compression member takes the form of a thin rod 61, pointed at both ends, the one end engaging in a shallow depression in the side of the plunger while the other end engages a depression in the spring 62 fixed to the bracket 63.

As the length of the compression member 61 between its hinged ends is greater than the effective length of the flexible leaves 49, 50 and 51, 52, any movement either up or down of the plunger from the zero position causes the rod 61 to move towards the spring 62 thereby imparting considerable resistance to the horizontal movement of the plunger. However, when the plunger is at right angles to this rod no resistance is given to the movement of the plunger. Initial movement from the zero point may therefore be caused with but a light load and yet the placing of a heavy load on the pan will not damage the instrument. Where such a wide range is not required the suspension shown in Figure 1 may be used in the construction of Figures 3 and 4.

The capacitor plates are supported in like manner to those of the previous construction, the movable plate 35 being attached to the plunger while fixed plate 36 is fixed to an insulator 37 from projections on the sides of the box-like member 57. Connection is made to the indicating device as in the previous construction.

In a still further form of construction the instrument of Figures 3 and 4 is constructed to be used the other way up, the indentor point being provided where the pan is and the pan where the indentor is, the dial gauge, which is not shown, being positioned to be clear of the surface being tested.

The indicating device 39 includes an electrical circuit as shown in Figure 2 comprising a pair of double triode valves $V^1$ and $V^2$ one part of each of which acts as a high frequency oscillator while the other part of each acts as an amplifier. The triode $a$ of $V^1$ is tuned by the inductance $L^1$ across which is connected the capacitor $C^1$ in the head of the instrument, while the triode $a$ of $V^2$ is tuned by a variable capacitor $C^2$ controlled by the knob 41 shown in Figure 1. The outputs of the two oscillators are combined by means of the capacitor $C^3$ in the triode $a$ of $V^1$ to produce an audio beat frequency which is amplified in the triode $b$ of $V^1$ followed by the triode $b$ of $V^2$, in the anode of which is connected the output transformer $T^1$. In the particular embodiment shown there is provided a telephone receiver 40 with the aid of which the indicating device is adjusted, thus rendering it useful in noisy locations, but where preferred a loudspeaker and a suitable output stage may be provided. Alternatively, a visual indicating device may be substituted for the earphone, but it is preferred to use an audio device so that the scale of the micrometer may be studied visually while the nul point is being obtained aurally. The circuit diagram includes means for both high and low tension voltages obtained from the supply mains by way of the cable 64 controlled by the switch 65.

The movement sensitive device may take several forms. For example, one of the supporting springs may be in the form of a strain gauge of the resistor type, and in which the resistance changes when the support is bent. Alternatively, the plunger may carry a core which is displaced in relation to a fixed coil so that the value of fixed inductance changes with movement of the indentor, or the plunger may carry a coil of wire which changes its position in relation to a fixed coil to change the mutual inductance of the two coils. Also, indicating means may be provided including optical means together with suitable associated apparatus within the scope of the invention, and therefore it is to be understood that the indicating means herein specifically described are by way of example only and that various alternatives may be used without departing from the scope of the invention.

I claim:
1. A material hardness tester comprising a member having a surface adapted to engage and support material undergoing test, a base, wedge means movably supporting said surface member on said base, an indentor, a support for the indentor on said base, means for resiliently mounting said indentor on its support above said material engaging surface which allows movement of said indentor relative to its support in a direction substantially perpendicular to said material engaging surface whereby said indentor may approach and indent or penetrate material supported on said surface, manually operable screw means for moving said wedge means and providing a responsive movement of said material engaging surface member relative to said indentor support in the direction of movement of said indentor whereby said screw means may be operated so as to place said indentor in a predetermined position relative to its support when said indentor is in engagement with material on said surface, means for indicating when said indentor is in said predetermined position in relation to its support, means for loading said indentor, and means responsive to operation of said wedge and screw means for measuring the extent of relative movement between said indentor support and said material engaging surface to restore said indentor to said predetermined position relative to its support after loading of said indentor.

2. A material hardness tester comprising a member having a surface adapted to engage material undergoing test, a base connected to said surface member, an indentor, a support for the indentor on said base, means for resiliently mounting said indentor on its support above said material engaging surface which allows movement of said indentor relative to its support in a direction substantially perpendicular to said material engaging surface whereby said indentor may approach and indent or penetrate material in engagement with said surface, manually operable means for moving said indentor support relative to said material engaging surface member in the direction of movement of said indentor to place said indentor in a predetermined position relative to its support when said indentor is in engagement with material engaged by said member surface, means for indicating when said indentor is in said predetermined position in relation to its support, means for loading said indentor, and means responsive to operation of said manually operable means for measuring the extent of relative movement between said indentor support and said material engaging surface to restore said indentor to said predetermined position relative to its support after loading of said indentor.

3. A material hardness tester comprising a member having a surface adapted to engage material undergoing test, a base, an indentor, a support for the indentor on said base, means for resiliently mounting said indentor on its support above said material engaging surface which allows movement of said indentor relative to its support in a direction substantially perpendicular to said material engaging surface whereby said indentor may approach and indent or penetrate material in engagement with said surface, manually operable means for moving said material engaging surface member and said indentor support relative to each other in the direction of movement of said indentor whereby said manually operable means may be operated so as to place said indentor in a predetermined position relative to its support when said indentor is in engagement with material engaged by said surface, means for indicating when said indentor is in said predetermined position in relation to its support, means for loading said indentor, and means responsive to operation of said manually operable means for measuring the extent of relative movement between said indentor support and said material engaging surface to restore said indentor to said predetermined position relative to its support after loading of said indentor.

4. Hardness tester as claimed in claim 3 in which the resilient mounting for the indentor comprises a pair of parallel leaf springs, the indentor being fixed at the adjacent ends of said leaf springs.

5. Hardness tester as claimed in claim 4 in which the ends of the leaf springs remote from the indentor are fixed to part of the instrument movable to and from the sample of material being tested and at right angles to said leaf springs.

6. Hardness tester as claimed in claim 3 in which the indentor is a plunger in the form of a rod one end of which is shaped to indent the material to be tested.

7. Hardness tester as claimed in claim 3 in which the indentor is mounted vertically for movement downwards to indent the material to be tested and a pan for weights is provided on the upper end of the indentor.

8. Hardness tester as claimed in claim 3 in which the wedge is mounted for movement at right angles to the line of movement of the indentor, a table being provided for support of the material being tested which is caused to move in the line of movement of the indentor by the movement of the wedge.

9. Hardness tester as claimed in claim 8 in which the wedge is held in contact with a plane surface on which it slides by helical spring means.

10. Hardness tester as claimed in claim 8 in which the table is T-shaped, the upright of the T forming a slide which slides on a plane surface and is held in conatct therewith by helical spring means.

11. Hardness tester as claimed in claim 10 in which the helical spring means urges the end of the upright of the T also in contact with the wedge.

12. Hardness tester as claimed in claim 3 in which a micrometer gauge is provided which indicates the extent of movement of the wedge.

13. Hardness tester as claimed in claim 3 in which the resilient mounting for the indentor comprises two pairs of parallel flexible leaves, the leaves in each pair meeting at a point at which the indentor is fixed, a compression member being provided between the pairs of leaves and pivotally connected to the indentor and urged in the direction of the indentor by spring means along a line which makes an angle to the line of movement of the plunger close to a right angle, the length of the compression member being greater than the effective lengths of the leaf springs.

14. Hardness tester as claimed in claim 3 in which the indentor is provided with a plate which together with a plate fixed in relation to the support means for the indentor forms a variable capacitor by means of which in conjunction with a suitable indicating device indicates when the indentor is in a predetermined position.

15. Hardness tester as claimed in claim 14 in which the indicating device comprises an electrical circuit including a pair of high frequency oscillators, amplifier means and indicating means, the frequency of oscillation of one of the oscillators being determined by the capacity of the variable capacitor associated with the indentor while the frequency of the other oscillator is manually adjustable to produce audio beat frequencies with that of the other oscillator.

References Cited in the file of this patent

UNITED STATES PATENTS

| | | |
|---|---|---|
| 725,577 | Miller | Apr. 14, 1903 |
| 1,218,771 | Hoeschen | Mar. 13, 1917 |
| 1,457,214 | Davis | May 29, 1923 |
| 1,822,662 | Letsch | Sept. 8, 1931 |
| 2,032,381 | Stoutenburgh | Mar. 3, 1936 |
| 2,053,472 | Gogan | Sept. 8, 1936 |
| 2,453,042 | Shore | Nov. 2, 1948 |

FOREIGN PATENTS

| | | |
|---|---|---|
| 514,592 | France | Nov. 17, 1920 |
| 603,531 | Germany | Oct. 3, 1934 |